Nov. 20, 1928.  
S. A. SHIELDS  
1,692,709
BEARING BOXING
Filed Nov. 26, 1927
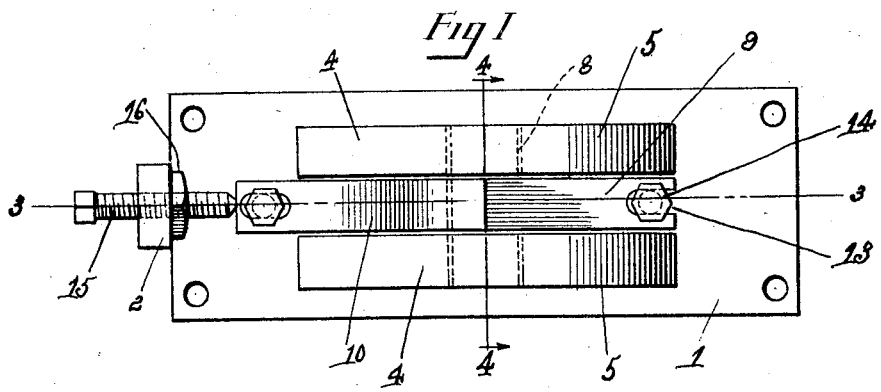
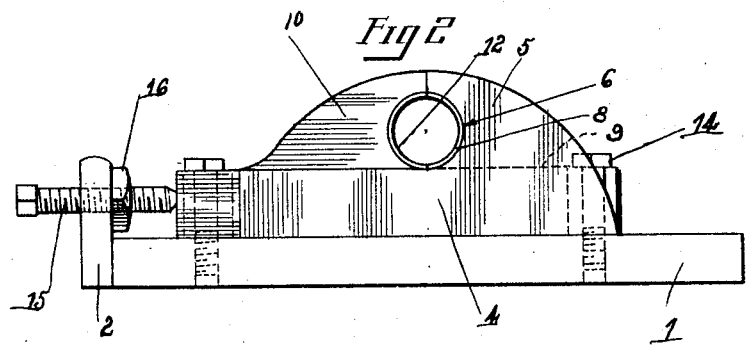
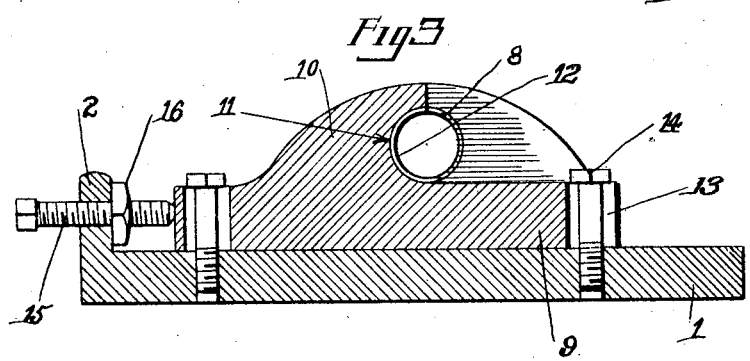
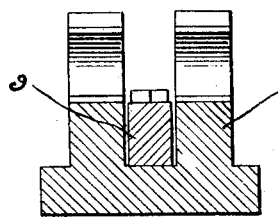
S. A. Shields
INVENTOR
BY Victor J. Evans
ATTORNEY
WITNESS:

Patented Nov. 20, 1928.

1,692,709

UNITED STATES PATENT OFFICE.

SAMUEL A. SHIELDS, OF EUREKA, CALIFORNIA.

BEARING BOXING.

Application filed November 26, 1927. Serial No. 235,937.

My present invention has reference to a bearing for line shafts, and my primary object is the provision of a bearing for this purpose which may be adjusted while the shaft is in motion and thereby obviate the delay and expense of the stopping of the machinery operated by the shaft.

A further object is the provision of a bearing for this purpose which obviates the necessity of shims or liners and which shall be of a comparatively simple construction and may be cheaply manufactured and readily positioned.

To the attainment of the foregoing and other objects which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a top plan view of my improvement.

Figure 2 is a side elevation thereof.

Figure 3 is a sectional view approximately on the line 3—3 of Figure 1.

Figure 4 is a transverse sectional view approximately on the line 4—4 of Figure 1.

As disclosed by the drawings, my improvement contemplates the employment of a base plate 1 having a right-angularly extending lug 2 at one end thereof.

The base 1 is integrally formed with a pair of spaced plates 4 disposed equidistantly from the center of the said base. These plates or ribs 4 have one of their edges arched upwardly, as at 5, and the inner straight faces of the said arched portions are formed with concaved notches or depressions 6 and in each of these depressions there is arranged a semicircular rib facing 8 of Babbitt metal.

Arranged for slidable movement between the plates or ribs 4 there is an intermediate plate 9. This plate has an upwardly arched portion 10 whose straight face is provided with a concaved notch or groove 11 that also receives therein a semi-circular lining of Babbitt metal 12. The grooved or notched face of the plate 9 is designed to register with the grooves or notches of the plates 4. The reduced and straight end portions of the plate 9 are provided with elongated slots or openings 13, respectively through which pass bolt members 14 that are screwed into the base plate 1. Threaded through an opening in the lug 2 there is a bolt 15. This bolt is designed to contact with one end of the slidable bearing plate or member 9 and has threaded thereon a lock nut 16 which contacts with the inner face of the lug 2 when the bearing member 9 is properly adjusted with respect to the bearings provided by the plates or ribs 4.

With my improvement it will be noted that the employment of shims or liners is entirely dispensed with and that by simply adjusting the bolt 15 the bearing may be adjusted with respect to the shaft therefor, without the necessity of stopping the movement of the shaft. The improvement is of extremely simple construction and the advantages thereof will, it is thought, be understood and appreciated by those skilled in the art to which such invention relates.

Having described the invention, I claim:

1. A bearing for a line shaft including a base, and having integral rightangularly disposed spaced plates on one of the faces thereof, each of said plates having one of their ends arched upwardly and merging into a straight face which has a semi-circular groove therein, a second plate slidable between the first mentioned plates and having an upwardly arched portion whose straight face is provided with a semi-circular groove designed to register with the first mentioned groove, means for holding the last mentioned plate from vertical movement on the base and adjustable means carried by the base, contacting with the last mentioned plate to adjust and hold the said last mentioned plate on the base.

2. A bearing for line shafts including a base designed to be fixed to a structure, and having a rightangular lug at one end thereof, spaced upstanding plates integrally formed on one of the faces of the base, each of said plates having one of their corners arched upwardly and merging into a straight face that has a transverse approximately semicircular depression therethrough and an approximately semicircular facing in the groove, a second plate slidable between the first mentioned plates having an upwardly arched portion that merges into a straight face which is provided with a transverse semi-circular groove, a semi-circular facing in the groove, said last mentioned plate having spaced elongated openings therethrough, headed elements received through these openings and adjustably secured on the base, a bolt member threaded through the lug and contacting with one of the ends of the last mentioned plate and a lock nut on the bolt.

In testimony whereof I affix my signature.

SAMUEL A. SHIELDS.